Aug. 30, 1932.  E. A. HALL  1,874,970
GAS BURNER SPUD
Filed April 3, 1931
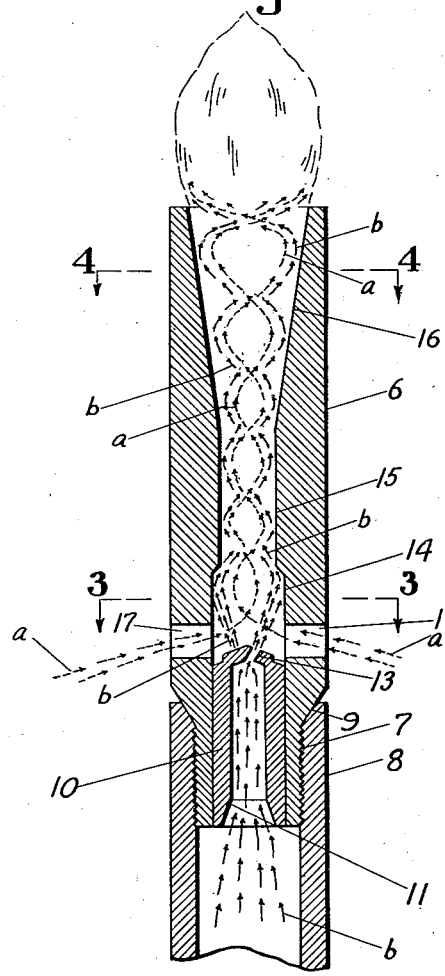
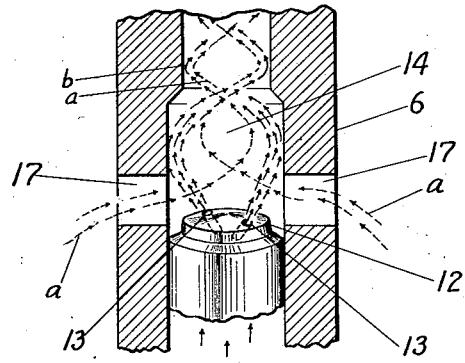
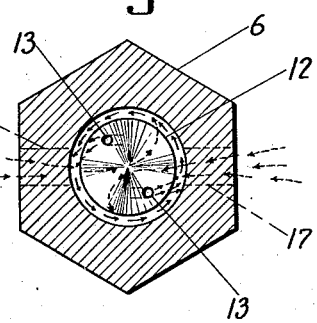
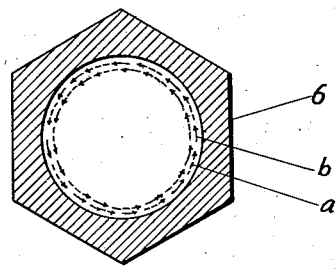
Inventor
Ernest A. Hall
By Owen & Owen
Attorneys Patented Aug. 30, 1932

1,874,970

UNITED STATES PATENT OFFICE

ERNEST A. HALL, OF TOLEDO, OHIO, ASSIGNOR TO THE COLUMBIA BURNER COMPANY, OF TOLEDO, OHIO, A CORPORATION OF OHIO

GAS BURNER SPUD

Application filed April 3, 1931. Serial No. 527,418.

This invention relates to improvements in gas burner spuds or tubes adapted to be used on burners for domestic and industrial heating, or wherever gas is used as a fuel.

Gas burners heretofore used for this purpose have been so designed that the gas and mixing air are directed through the burner tube with the whole or a portion of the air in enveloping relation to the gas, or with an air pencil or stream extending from the outer end of the spud to the gas-supply jet thereof and in contact with the side wall of the spud. A spud of this type will perform its function very well when the gas pressure is sufficiently high or when it is used with light gravity gas, but when it is used with low gas pressure or with heavy gravity gas or with the gas turned low, the flame will flash back and burn down in the mixing tube or in the gas orifice, thus resulting in incomplete combustion and causing carbon to form in the tube and on the walls of appliances.

It is the object of this invention to provide a gas burner spud especially adapted for use with heavy gravity gas under very low pressure, and more particularly a spud which permits the gas to be turned down to burn a flame which is very small and low in gas consumption and which will not flash or burn back in the mixing tube or orifice when used under such conditions.

The invention will be more particularly described in connection with the accompanying drawing, in which—

Figure 1 is a central longitudinal section of the improved spud;

Figure 2 is an enlarged longitudinal section through the base of the spud with the gas orifice insert shown in perspective;

Figure 3 is a section taken on the line 3—3 of Fig. 1; and

Figure 4 is a section taken on the line 4—4 of Fig. 1.

As illustrated in the drawing, the spud comprises a tubular body 6 having a reduced threaded end 7 adapted to be connected with the gas supply line 8. The spud and the end of the supply line 8 are preferably formed with tapered machined surfaces 9 adapted to insure a gas-tight joint without the use of a compound or packing, whenever the spud is screwed into operative position.

The spud is provided at its base with an inlet throat 10, which as a manufacturing proposition is preferably in the form of a bushing or insert rather than an integral part of the spud. The base of this insert is chamfered, as shown at 11, to facilitate the flow of gas. The top of the insert is, in the present instance, reduced as shown at 12 and is provided with two outlet orifices 13, diametrically opposite each other and so directed that the streams of gas are discharged in an upwardly inclined direction and substantially in a tangential direction with respect to the wall of the mixing chamber 14. Thus the gas discharged from these orifices flows upwardly in spiral streams and in immediate contact with the wall of the spud.

While the contour of the passageway through the spud may be of various forms, it is preferably formed, as shown in Figure 1, with a restricted portion or venturi 15 above the chamber 14 and then becomes gradually larger in diameter, as shown at 16, toward the upper end of the spud. Air openings 17 are provided near the base of the spud.

With the construction shown, the gas will flow upwardly in a spiral course, as indicated by the arrows $b$, and will gradually spread out and expand, forming a gaseous envelope in immediate contact with the wall of the spud as it emerges from the upper end thereof. The air, which flows in through the openings 17, will ascend inside of the gaseous envelope, as indicated by the arrows $a$, and will become gradually mixed with the gas. A distinct whirling or twisting motion is thus imparted to the gas and air throughout the entire length of the tube, which not only causes a better mixture of gas and air, but causes the mixture to cling to the outside wall of the tube and at no time allows a single stream or pencil of gas surrounded by air to travel up the center of the tube. With this condition the spud will burn on pressure of a small fraction of an inch as measured by the water-glass, without flashing back or burning within the tube or orifices. It will burn with natural gas at a pressure as high as eight inches without blowing away. The same spud may be used either with artificial or manufactured gas with satisfactory results.

While I have shown and described specifically one form of the invention, it is to be understood that the same may be modified considerably without departing from the salient features of the invention which is primarily designed to cause the gas rather than the air to come in contact with the wall of the spud.

What I claim is:

1. A gas burner spud comprising a tubular body provided with a gas inlet directed upwardly at an inclination and approximately tangential to the inside surface of the body to direct gas in spiral form around the interior wall of the body, said body having an air inlet at the side of the gas inlet to admit air to the central portion of the body within the spiral gas stream.

2. A gas burner spud comprising a tubular body provided with a plurality of equidistant gas inlets arranged to direct streams of gas spirally along the inside surface of the body to provide a tubular gas stream within the body in contact therewith substantially throughout its length, said body being provided with air inlets between the gas inlets and arranged to admit air to the central portion of said body within the gas stream and spaced thereby from the body.

3. A gas burner spud comprising a tubular body provided with a plurality of equidistant gas inlets inclined upwardly and approximately tangential to the inside surface of the body, whereby to cause streams of gas to flow in spiral paths upwardly along the inside surface of said body, said body being provided with air inlets between the gas inlets and arranged to admit air to the central portion of said body within the gas stream and spaced thereby from the body.

In testimony whereof I have hereunto signed my name to this specification.

ERNEST A. HALL.